United States Patent
Sung

(10) Patent No.: US 12,347,081 B2
(45) Date of Patent: Jul. 1, 2025

(54) METHOD FOR IMAGE CORRECTION, DISPLAY DEVICE, AND STORAGE MEDIUM

(71) Applicant: Interface Advanced Technology (Chengdu) Co., Ltd., Chengdu (CN)

(72) Inventor: Chu-Jen Sung, Chengdu (CN)

(73) Assignee: INTERFACE ADVANCED TECHNOLOGY (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 18/550,431

(22) PCT Filed: Jun. 13, 2023

(86) PCT No.: PCT/CN2023/099854
§ 371 (c)(1),
(2) Date: Sep. 13, 2023

(87) PCT Pub. No.: WO2024/244053
PCT Pub. Date: Dec. 5, 2024

(65) Prior Publication Data
US 2025/0037253 A1 Jan. 30, 2025

(30) Foreign Application Priority Data
Jun. 1, 2023 (CN) .......................... 202310644594.9

(51) Int. Cl.
*G06T 5/80* (2024.01)
*G06F 3/01* (2006.01)
*G06T 7/00* (2017.01)

(52) U.S. Cl.
CPC .............. *G06T 5/80* (2024.01); *G06F 3/013* (2013.01); *G06T 7/0002* (2013.01); *G06T 2207/20021* (2013.01); *G06T 2207/30168* (2013.01)

(58) Field of Classification Search
CPC .................. G06T 5/80; G06T 7/0002; G06T 2207/20021; G06T 2207/301168; G06T 7/60; G06F 3/013
See application file for complete search history.

(56) References Cited

U.S. PATENT DOCUMENTS

| | | | |
|---|---|---|---|
| 10,241,545 B1 * | 3/2019 | Richards | .................. G06F 3/013 |
| 2007/0242897 A1 * | 10/2007 | Bushell | ...................... G06T 5/80 |
| | | | 382/167 |

(Continued)

FOREIGN PATENT DOCUMENTS

| | | | |
|---|---|---|---|
| CN | 102592264 A | * | 7/2012 |
| CN | 108305224 A | | 7/2018 |

(Continued)

OTHER PUBLICATIONS

Search Report in related PCT Application No. PCT/CN2023/099854, mailed Feb. 7, 2024, 4 pages.

(Continued)

*Primary Examiner* — Brent D Castiaux
(74) *Attorney, Agent, or Firm* — GREENBLUM & BERNSTEIN, P.L.C.

(57) ABSTRACT

The present disclosure relates to a method for image correction, a head-mounted display device, and a storage medium. The method includes: obtaining a currently displayed test image when a display device is starting; calculating the coordinates of the center point of the test image; determining multiple distortion amounts and a distortion coefficient corresponding to each distortion amount; obtaining the original pixel coordinates of the target sampling points; calculating the distorted pixel coordinates of the target sampling points according to the multiple distortion amounts, the distortion coefficient corresponding to each distortion amount, and the original pixel coordinates; cal- (Continued)

culating the actual deformation of the test image; and correcting the test image according to the actual deformation.

20 Claims, 12 Drawing Sheets

(56) References Cited

U.S. PATENT DOCUMENTS

| | | | | |
|---|---|---|---|---|
| 2012/0170853 | A1* | 7/2012 | Song | G06T 5/80 382/199 |
| 2014/0247287 | A1 | 9/2014 | Saigo | |
| 2017/0199099 | A1* | 7/2017 | Chen | G01M 11/0264 |
| 2018/0260940 | A1* | 9/2018 | Langlois | G06T 5/80 |
| 2019/0102868 | A1* | 4/2019 | Beric | H04N 25/61 |

FOREIGN PATENT DOCUMENTS

| | | |
|---|---|---|
| CN | 110232667 A | 9/2019 |
| CN | 110264426 A | 9/2019 |
| CN | 110784691 A | 2/2020 |
| CN | 111260567 A | 6/2020 |
| CN | 112381739 A | 2/2021 |
| CN | 113066029 A | 7/2021 |
| CN | 113222862 A | 8/2021 |
| CN | 116012241 A | 4/2023 |

OTHER PUBLICATIONS

Office Action in related TW Application No. 112128220, issued May 22, 2024, 12 pages.
Office action issued in the counterpart Chinese Patent Application No. 202310644594.9 dated Apr. 1, 2025, along with English translation thereof.

* cited by examiner

| | |
|---|---|
| Dividing the test image into multiple concentric regions according to a horizontal axis, a vertical axis, and the coordinates of the center point, the coordinates of the center point of each region are consistent with the coordinates of the center point of the test image, the multiple concentric regions include the preset undistorted rectangular region, the horizontal axis and the vertical axis are established based on the coordinates of the center point of the test image. | 902 |
| Calculating a first distortion amount and remaining distortion amounts except the first distortion amount according to the coordinates of the center point, the distortion coefficient corresponding to the first distortion amount is a preset first distortion coefficient, and the first distortion amount is equal to the vertical distances from the coordinates of the center point of the preset undistorted rectangular region to the boundaries of the preset undistorted rectangular region | 904 |
| Determining distortion coefficients corresponding to the remaining distortion amounts according to the first distortion amount and the remaining distortion amounts except the first distortion amount | 906 |
| Determining whether the distortion coefficients need to be adjusted according to a preset requirement | 908 |
| Adjusting the distortion coefficients to obtain adjusted distortion coefficients if the distortion coefficients need to be adjusted | 910 |

FIG. 9

METHOD FOR IMAGE CORRECTION, DISPLAY DEVICE, AND STORAGE MEDIUM

The present application is a national stage application of PCT international application No. PCT/CN2023/099854 filed on Jun. 13, 2023, which claims the priority to Chinese Patent Application No. 2023106445949 filed with the Chinese Patent Office on Jun. 1, 2023, entitled "METHOD AND DEVICE FOR IMAGE CORRECTION, DISPLAY DEVICE, STORAGE MEDIUM AND PROGRAM PRODUCT". The entire contents of both the applications are incorporated by reference.

TECHNICAL FIELD

The present disclosure relates to the technical field of image processing, and particularly to a method for image correction, a display device, and a storage medium.

BACKGROUND

In traditional methods, image distortion caused by lens optical distortion is corrected during the development stage of display devices. Firstly, optical distortion offset data of each sub-pixel is measured, then the corresponding distortion function is calculated according to the actual measured optical distortion offset data of each sub-pixel, and the distortion function is applied to the system side to correct the image distortion.

However, as the distortion function is set at the system side during the development stage of display devices and different lenses of the display devices have different optical distortion amounts, it is impossible to correct the image in each individual display device through a single distortion function.

SUMMARY

In a first aspect, the present disclosure provides a method for image correction, which is applied to a display device. The method includes the following steps. A currently displayed test image is obtained when the display device is starting. Coordinates of a center point of the test image is calculated. Multiple distortion amounts and a distortion coefficient are determined corresponding to each distortion amount according to the coordinates of the center point. Target sampling points are selected and original pixel coordinates of the target sampling points are obtained. The target sampling points are vertices of each boundary of the test image. Distorted pixel coordinates of the target sampling points are calculated according to the multiple distortion amounts, the distortion coefficients corresponding to each of the distortion amounts, and the original pixel coordinates. Actual deformation of the test image is calculated according to the distorted pixel coordinates. The test image is corrected according to the actual deformation.

In some embodiments, the test image includes a preset undistorted rectangular area. The calculation of the coordinates of the center point of the test image includes: calculating the coordinates of the center point of the test image according to a midpoint of each of four sides of the preset undistorted rectangular region.

In some embodiments, the determination of multiple distortion amount and a distortion coefficient corresponding to each distortion amount according to the coordinates of the center point of the test image includes the following steps. The test image is divided into multiple concentric regions according to a horizontal axis, a vertical axis, and the coordinates of the center point. Coordinates of a center point of each of the regions are consistent with the coordinates of the center point of the test image. The multiple concentric regions include the preset undistorted rectangular region, the horizontal axis and the vertical axis are established based on the coordinates of the center point of the test image. A first distortion amount and remaining distortion amounts other than the first distortion amount are calculated according to the coordinates of the center point. A distortion coefficient corresponding to the first distortion amount is a preset first distortion coefficient, and the first distortion amount is equal to a vertical distance from the center point of the preset undistorted rectangular region to a boundary of the preset undistorted rectangular region. Distortion coefficients corresponding to the remaining distortion amounts are determined according to the first distortion amount and the remaining distortion amounts other than the first distortion amount. It is determined whether the distortion coefficients corresponding to the remaining distortion amounts need to be adjusted according to a preset requirement. The distortion coefficients corresponding to the remaining distortion amounts are adjusted to obtain adjusted distortion coefficients if the distortion coefficients need to be adjusted.

In some embodiments, determining whether the distortion coefficients corresponding to the remaining distortion amounts need to be adjusted according to the preset requirement includes: establishing an X-axis and a Y-axis in each of the regions in the divided test image according to the coordinates of the central point of the test image, setting sampling points in each of the regions, and determining whether the distortion coefficients corresponding to the remaining distortion amounts need to be adjusted according to the sampling points in the regions.

In some embodiments, the sampling points includes a first type of sampling points. The first type of sampling points are intersection points of the X-axis established in each of the regions and the boundaries of the corresponding region. The distortion coefficients include horizontal distortion coefficients. Determining whether the distortion coefficients corresponding to the remaining distortion amounts need to be adjusted according to the sampling points in the regions includes: determining whether the first type of sampling points in the regions are on a same horizontal line; and determining that the horizontal distortion coefficients corresponding to the remaining distortion amounts need to be adjusted if the first type of sampling points are not on the same horizontal line.

In some embodiments, the sampling points includes a second type of sampling points, the second type of sampling points are intersection points of the Y-axis established in each of the regions and boundaries of the corresponding region, the distortion coefficients include vertical distortion coefficients. Determining whether the distortion coefficients corresponding to the remaining distortion amounts need to be adjusted according to the sampling points in the regions further includes: determining whether the second type of sampling points in the regions are on a same vertical line; and determining that the vertical distortion coefficients corresponding to the remaining distortion amounts need to be adjusted if the second type of sampling points are not on the same vertical line.

In some embodiments, determining whether the distortion coefficients corresponding to the remaining distortion amounts need to be adjusted according to the sampling points in the regions further includes: determining that the distortion coefficients corresponding to the remaining distortion amounts do not need to be adjusted if the first type of sampling points are on the same horizontal line and the second type of sampling points are on the same vertical line.

In some embodiments, the distortion coefficient corresponding to each remaining distortion amount is calculated by dividing a value of the corresponding remaining distortion amount by a value of the first distortion amount.

In some embodiments, the actual deformation of the test image is calculated according to a vertical distance between a highest point and a lowest point of each boundary of the test image.

In a second aspect, the present disclosure also provides a head-mounted display device. The head-mounted display device includes a memory and a processor. The memory stores a computer program. The processor, when executing the computer program, performs the following steps: obtaining a currently displayed test image when the display device is starting; calculating coordinates of a center point of the test image; determining multiple distortion amounts and a distortion coefficient corresponding to each distortion amount according to the coordinates of the center point; selecting target sampling points and obtaining original pixel coordinates of the target sampling points, the target sampling points being vertices of each boundary of the test image; calculating distorted pixel coordinates of the target sampling points according to the multiple distortion amounts, the distortion coefficients corresponding to each of the distortion amounts, and the original pixel coordinates; calculating actual deformation of the test image according to the distorted pixel coordinates; and correcting the test image according to the actual deformation.

In a third aspect, the present application also provides a non-transitory computer-readable storage medium. The non-transitory computer-readable storage medium has a computer program stored therein. When the computer program is executed by a processor, the following steps are implemented: obtaining a currently displayed test image when the display device is starting; calculating coordinates of a center point of the test image; determining multiple distortion amounts and a distortion coefficient corresponding to each distortion amount according to the coordinates of the center point; selecting target sampling points and obtaining original pixel coordinates of the target sampling points, the target sampling points being vertices of each boundary of the test image; calculating distorted pixel coordinates of the target sampling points according to the multiple distortion amounts, the distortion coefficients corresponding to each of the distortion amounts, and the original pixel coordinates; calculating actual deformation of the test image according to the distorted pixel coordinates; and correcting the test image according to the actual deformation.

Details of one or more embodiments of the present disclosure are set forth in the accompanying drawings and the description below. Other features, objects and advantages of the present disclosure will become more apparent from the specification, drawings, and claims.

BRIEF DESCRIPTION OF THE DRAWINGS

In order to illustrate the technical solutions in the embodiments of the present disclosure or prior art more clearly, the accompanying drawings used in the description of the embodiments or prior art will be briefly introduced below. Apparently, the accompanying drawings in the following description are only some embodiments of the present disclosure. For those of ordinary skill in the art, other drawings can also be derived from these drawings without creative effort.

FIG. 9 is a schematic flowchart of determining distortion coefficients according to one or more embodiments;

DETAILED DESCRIPTION

The technical solutions in the embodiments of the present disclosure will be described clearly and completely in the following with reference to the accompanying drawings in the embodiments of the present disclosure. Apparently, the described embodiments are only a part of the embodiments of the present disclosure and not all of the embodiments. All the other embodiments obtained by a person of ordinary skill in the art without creative efforts based on the embodiments in the present disclosure fall within the protection scope of the present disclosure.

With the development of technology, more and more people use head-mounted display devices, such as VR displays, for image viewing. However, a certain degree of distortion may occur when using the display devices to view images. A method known to the applicant for correcting the image distortion caused by lens optical distortion is to adjust a distortion function set in the development stage of display devices. Due to variations in the optical distortion amounts of lenses used in different display devices, it is impossible to correct the image in each display device through a single distortion function.

Figure 1:
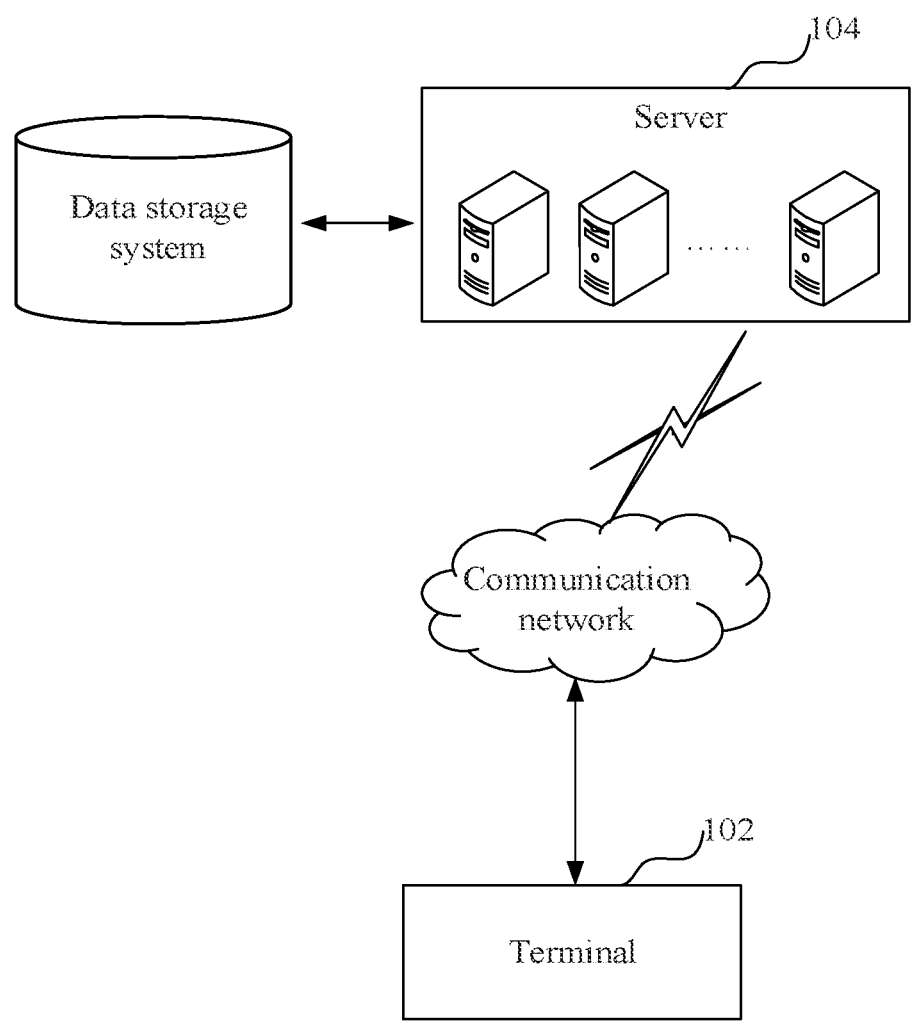
FIG. 1 is an application environment diagram of a method for image correction according to one or more embodiments.

Based on this, the present disclosure provides a method for image correction that may be applied to an application environment shown in FIG. 1. In the application environment, a display device 102 communicates with a server 104 through a network. A data storage system can store images that need to be processed by the server 104. The data storage system can be integrated in the server 104, or placed in the cloud or other network servers. The display device 102 may be provided with a memory to store images that need to be processed by the display device 102.

The display device 102, when being started, obtains a test image transmitted by the server 104, calculates the coordinates of the center point of the test image according to the test image, and determines multiple distortion amounts and the distortion coefficient corresponding to each distortion amount according to the coordinates of the center point. Target sampling points are selected, and original pixel coordinates of the target sampling points are obtained. The target sampling points are the vertices of the boundaries of the test image. Distorted pixel coordinates of the target sampling points are calculated according to the multiple distortion amounts, the distortion coefficient corresponding to each distortion amount, and the original pixel coordinates. The actual deformation of the test image is calculated according to the distorted pixel coordinates. The test image is corrected according to the actual deformation.

The test image may be stored in the server 104 or may be pre-stored in the memory of the display device 102.

The display device 102 may be, but is not limited to, various portable wearable devices. The portable wearable devices may be smart watches, smart bracelets, head-mounted devices, and the like. The server 104 may be implemented by an independent server or a server cluster composed of multiple servers.

Figure 2:
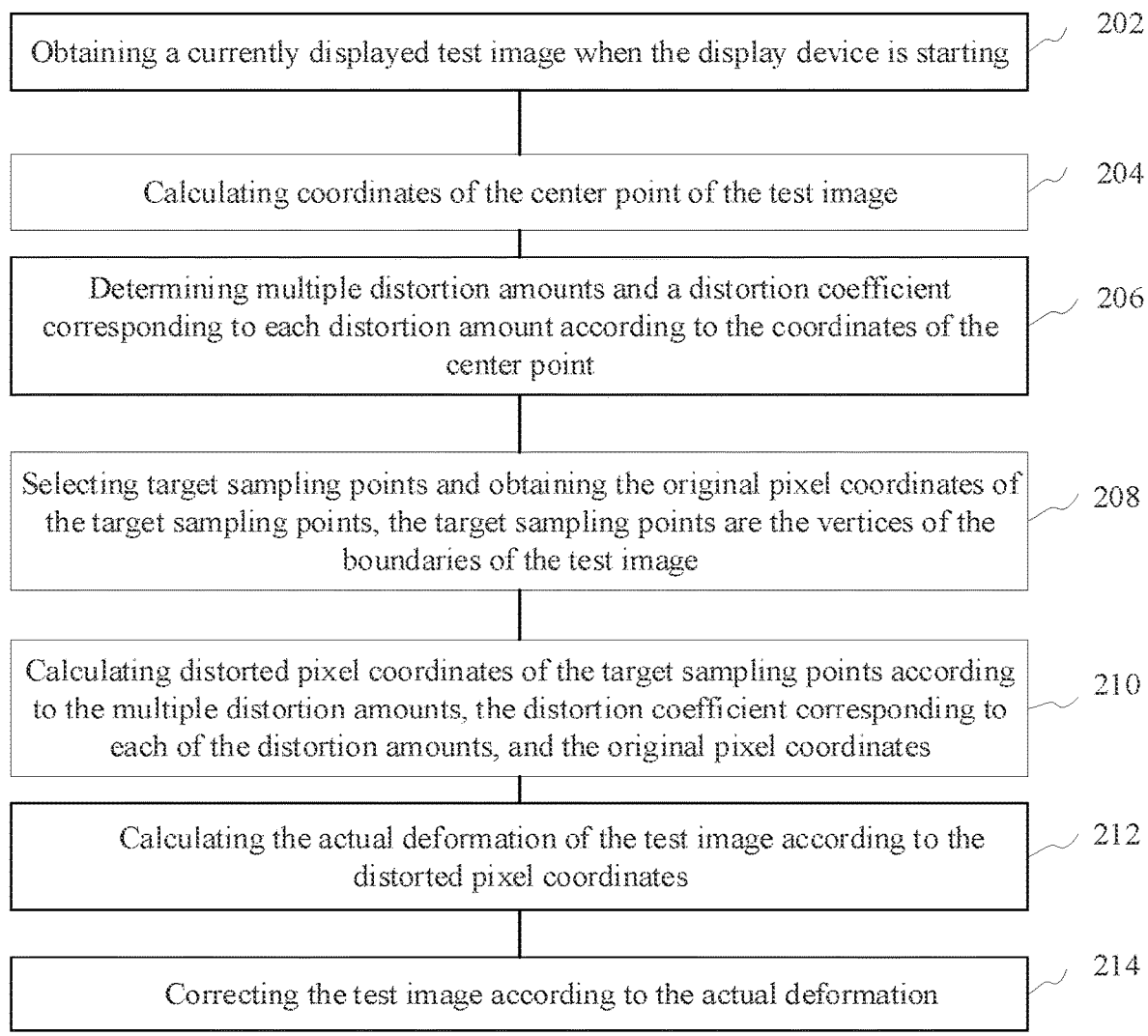
FIG. 2 is a schematic flowchart of a method for image correction according to one or more embodiments.

In an embodiment, as shown in FIG. 2, a method for image correction is provided. The method will be illustrated by taking the application of the method to the display device 102 in FIG. 1 as an example. The method includes the following steps.

In step 202, a currently displayed test image is obtained when the display device is starting.

In some embodiments, the display device may be a head-mounted display device, and the head-mounted display device includes an image correction module. Specifically, a structural diagram of the image correction module can be referred to in FIG. 3. The image correction module includes an image reflection unit 31, an eye tracking unit 32, an optical display unit 33, and a computing unit 34. The optical display unit 33 includes an optical lens 331, and a display screen 332.

The image reflection unit 31 includes a mirror surface and an opaque scratch-resistant material. A pull-out cover may be provided to protect the optical lens and the display screen of the optical display unit when the head-mounted display device is turned off. The image reflection unit is configured to reflect a test image provided by the display screen when the head-mounted display device is turned on, so that the eye tracking unit can obtain the distortion information of the test image and send the distortion information to the computing unit to realize the image correction. The distortion information may include distortion amount.

The eye tracking unit 32 includes a camera to detect the distortion information of the test image, and is configured to calculate the rotation angle and gaze direction of the user's eye.

The optical display unit 33 includes the optical lens 331 and the display screen 332, and realizes near-eye display through the optical lens and the display screen.

The computing unit 34 is configured to perform image correction and/or calculate the position of the user's gaze point according to the distortion information detected by the eye tracking unit 32.

Figure 4:
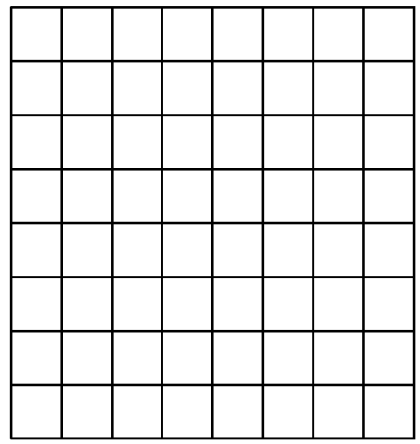
FIG. 4 is a schematic diagram of an undistorted image according to one or more embodiments.

A test image is set in the display device. The test image is collinear. That is, when the test image is displayed normally, the midpoint of each of the four sides of the test image and the two vertices of the corresponding side are located on one straight line, which means that the test image is collinear. Specifically, reference may be made to FIG. 4 for the display situation of the test image in an undistorted state.

Exemplarily, in a condition that the head-mounted display device is starting, a currently displayed test image may be obtained from the server or the memory of the head-mounted display device. The currently displayed test image may or may not be distorted.

Figure 5:
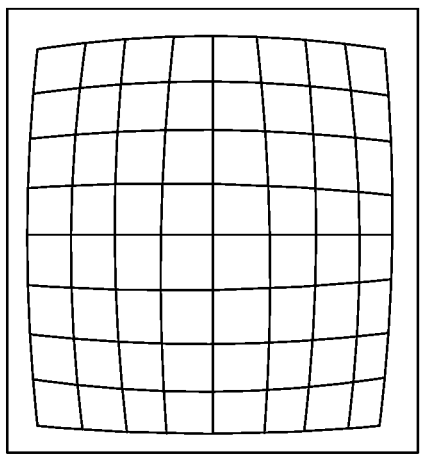
FIG. 5 is a schematic diagram of an image with barrel distortion according to one or more embodiments.
Figure 6:
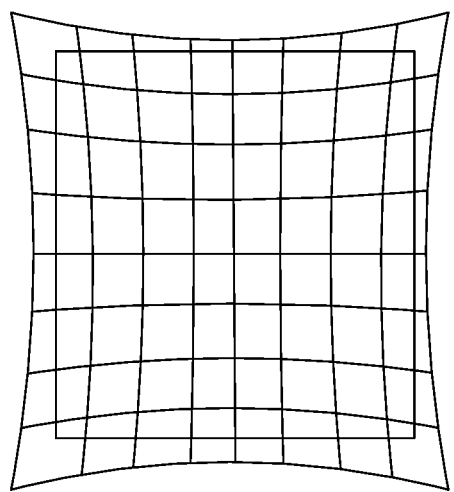
FIG. 6 is a schematic diagram of an image with pincushion distortion according to one or more embodiments.

Image distortion is a type of optical distortion, which refers to an optical aberration that causes physical straight lines to deform and bend. Image distortion generally includes two forms: barrel distortion and pincushion distortion. Barrel distortion is a phenomenon caused by the lens in which the image is expanded into a barrel shape. Typically, barrel distortion is easy to appear on wide-angle lenses. Pincushion distortion is a phenomenon caused by the lens in which the image "shrinks" towards the center. Typically, pincushion distortion is easy to appear on telephoto lenses. Specifically, an image with barrel distortion can be referred to in FIG. 5, and an image with pincushion distortion can be referred to in FIG. 6.

In step 204, coordinates of the center point of the test image are calculated.

The coordinates of the center point of the test image indicate the center of the test image.

Figure 3:
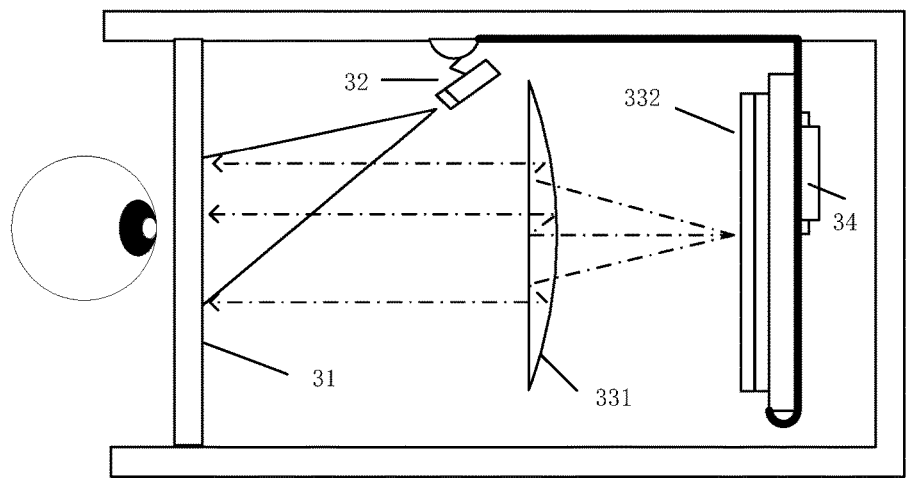
FIG. 3 is a structural diagram of an image correction module according to one or more embodiments.

In some embodiments, the coordinates of the center point of the test image can be calculated by using the eye tracking unit in FIG. 3 to monitor the test image. Specifically, in the case that the test image is distorted, the coordinates of the center point of the test image can be calculated by setting an undistorted rectangular region in the test image.

In step 206, multiple distortion amounts and a distortion coefficient corresponding to each distortion amount are determined according to the coordinates of the center point.

Exemplarily, the distortion amounts are calculated according to the coordinates of the center point. The distortion coefficient corresponding to each distortion amount can be determined according to the magnitude of the multiple distortion amounts.

In some embodiments, the test image can be divided into multiple concentric regions, the corresponding centers of all of which are the center point of the test image. Specifically, the distortion amount of each of the regions may be obtained by dividing the test image into regions based on the coordinates of the center point of the test image. The distortion coefficient corresponding to each distortion amount is determined according to the distortion amount of each of the regions.

In step 208, target sampling points are selected, and the original pixel coordinates of the target sampling points are obtained. The target sampling points are the vertices of the boundaries of the test image.

Figure 7:
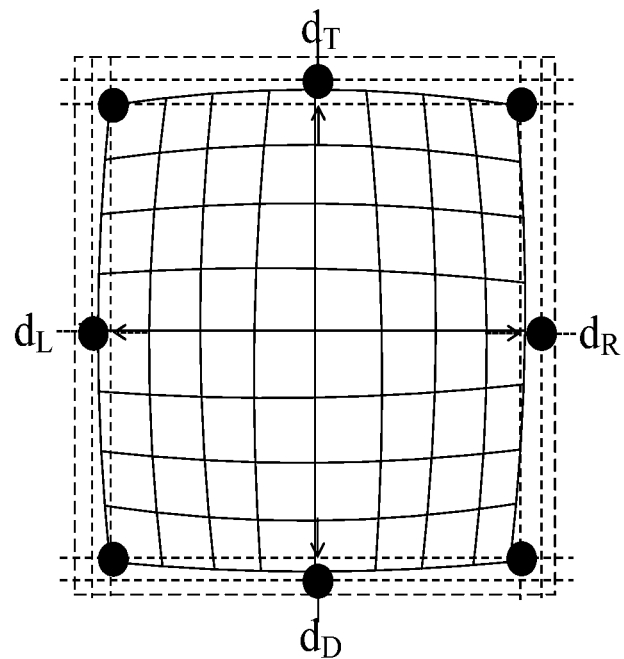
FIG. 7 is a schematic diagram of calculating an actual deformation according to one or more embodiments.
Figure 8:
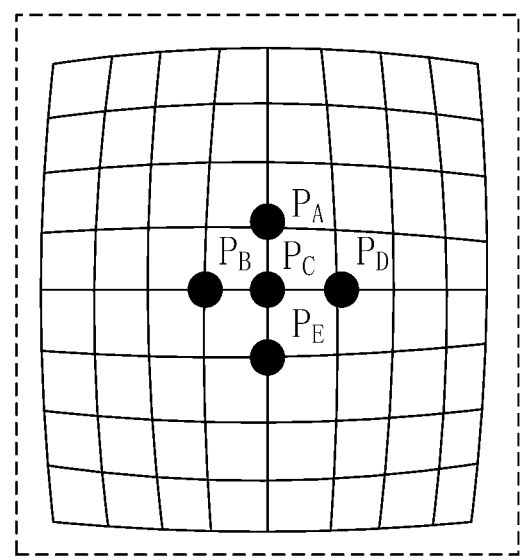
FIG. 8 is a schematic diagram of calculating center point coordinates according to one or more embodiments.

Exemplarily, the target sampling points are selected from the test image. The vertices of the boundaries of the test image may be selected. In general, the vertices of the boundaries of the test image include four vertices of the test image and four middle points of the boundaries of the test image. Therefore, there are eight target sampling points in total. Specifically, the position of the target sampling points in the test image can be referred to in FIG. 7.

In some embodiments, the original pixel coordinates of the target sampling points, i.e., the coordinates of the target sampling points without distortion, can be obtained after the target sampling points are selected.

In step 210, distorted pixel coordinates of the target sampling points are calculated according to the multiple distortion amounts, the distortion coefficient corresponding to each of the distortion amounts, and the original pixel coordinates.

In some embodiments, the test image is divided into multiple concentric regions, and the corresponding centers of all of which are the center point of the test image. The number of the distortion amounts and the number of the distortion coefficients corresponding to the distortion amounts are both equal to the number of the concentric regions, so that the distorted pixel coordinates of the target sampling points can be calculated according to the multiple distortion amounts, the distortion coefficient corresponding to each distortion amount, and the original pixel coordinates of the selected target sampling points.

In step 212, the actual deformation of the test image is calculated according to the distorted pixel coordinates.

In some embodiments, the actual deformation of the test image may be calculated according to the pixel coordinates of the distorted target sampling points. Specifically, the target sampling points include the vertices of each boundary of the test image, and the actual deformation of the test image can be calculated according to the vertical distance between the highest point and the lowest point of each boundary of the test image.

An example is provided to better understand the process of calculating the actual deformation. Specifically, referring to FIG. 7, a schematic diagram of calculating the actual deformation is provided. The actual deformation of the test image is calculated in the case of barrel distortion. There are four actual deformations in the test image, namely $d_T$, $d_D$, $d_L$, and $d_R$. If an X-axis and a Y-axis are established based on the coordinates of the center point of the test image, the corresponding $d_T$ and $d_D$ are the deformations of the test image on the Y-axis, which may be referred to as $Y_d$. The corresponding $d_L$ and $d_R$ are the deformations of the test image on the X-axis, which may be referred to as $X_d$.

Specifically, the actual deformation can be calculated according to the vertical distance between the highest point and the lowest point of each boundary of the test image.

In step 214, the test image is corrected according to the actual deformation.

Exemplarily, it is determined that the test image is in an undistorted state if the actual deformation is equal to zero or close to zero. It is determined that the test image is in a distorted state if the actual deformation is greater than zero.

In some embodiments, after the actual deformation of the test image is calculated, image distortion compensation may be performed by an image processing chip in the display device to correct the $X_d$ and $Y_d$ until the actual deformation is equal to or close to zero.

Exemplarily, the image processing chip may be a sensor chip or a video processing chip. Specifically, the type of the image processing chip may be selected according to actual conditions and is not limited in the present disclosure.

In the above method for image correction, the currently displayed test image is obtained when the display device is starting. The coordinates of the center point of the test image are calculated. Multiple distortion amounts and the distortion coefficient corresponding to each distortion amount are determined according to the coordinates of the center point. The target sampling points are selected, and the original pixel coordinates of the target sampling points are obtained. The target sampling points are the vertices of the boundaries of the test image. The distorted pixel coordinates of the target sampling points are calculated according to the multiple distortion amounts, the distortion coefficient corresponding to each distortion amount, and the original pixel coordinates. The actual deformation of the test image is calculated according to the distorted pixel coordinates. The test image is corrected according to the actual deformation. The present method enables the calculation of the actual deformation of the test image according to the test image currently displayed when the display device is starting, so as to correct the test image according to the actual deformation, achieving a tailored optimization of the image distortion for each display device.

In an embodiment, the test image includes a preset undistorted rectangular region, and the step 104 includes:
    calculating the current coordinates of the center point of the test image according to the midpoint of each of the four sides of the preset undistorted rectangular region.

In some embodiments, regardless of whether barrel or pincushion optical distortion occurs in the test image, the farther the region is from the center of the lens, the more serious the image distortion is. Therefore, in the case of barrel distortion and pincushion distortion, the closer the sampling point is to the center point, the smaller the distortion is. Based on this, the test image is set to include a preset undistorted rectangular region. Specifically, referring to FIG. 7, a schematic diagram of calculating the coordinates of the center point is provided. When barrel distortion occurs in a test image, the preset undistorted rectangular region may include five points: PA, PB, PC, PD, and PE. PA, PB, PD, and PE are the midpoints of the boundaries of the undistorted rectangular region, respectively, and PC is the coordinates of the center point. Considering that different optical lenses have different characteristics, the size of the rectangular region is not specifically defined. Specifically, the smaller the rectangular region, the finer the image distortion adjustment region, but it increases the workload of image data processing. Conversely, the larger the rectangular region, the rougher the image distortion adjustment region, but it reduces the workload of image data processing.

In this embodiment, the current coordinates of the center point of the test image can be calculated according to the midpoint of each of the four sides of the preset undistorted rectangular region. Therefore, the actual deformation of the test image can be calculated according to the coordinates of the center point, so as to correct the test image according to the actual deformation, achieving a tailored optimization of the image distortion for each display device.

In an embodiment, referring to FIG. 9, a schematic flowchart of determining distortion coefficients is provided, and the step 208 includes the following steps S902-S910.

In step 902, the test image is divided into multiple concentric regions according to a horizontal axis, a vertical axis, and the coordinates of the center point. The coordinates of the center point of each region are consistent with the coordinates of the center point of the test image. The multiple concentric regions include the preset undistorted rectangular region. The horizontal axis and the vertical axis are established based on the coordinates of the center point of the test image.

Figure 10:
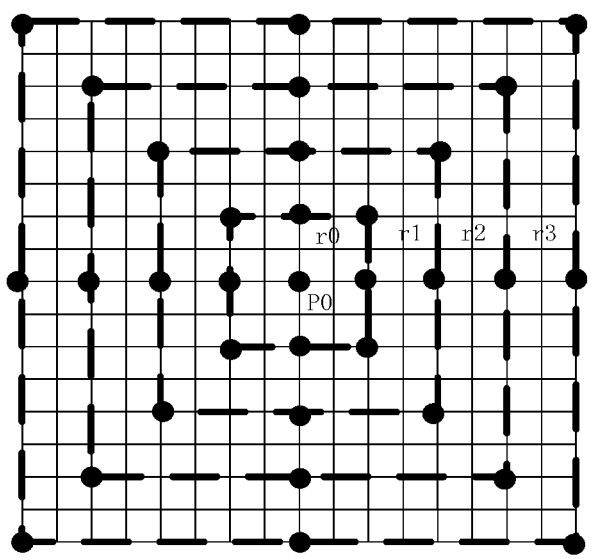
FIG. 10 is a schematic diagram of division of concentric regions according to one or more embodiments.

In some embodiments, the horizontal axis and the vertical axis are established based on the coordinates of the center point of the test image, so as to divide the test image into multiple concentric regions according to the coordinates of the center point of the test image, the horizontal axis, and the vertical axis. Specifically, the regions obtained by dividing the test image include the preset undistorted rectangular region, and the test image may be divided into a preset number of concentric regions according to the size of the preset undistorted rectangular region. Specifically, the division of concentric regions of the test image can be referred to in FIG. 10, the test image includes the coordinates of the center point $P_0$ and four concentric regions: region $r_0$, region $r_1$, region $r_2$, and region $r_3$.

Exemplarily, the more regions the test image is divided into, the finer the image distortion adjustment region is, but it increases the workload of image data processing. Specifically, the preset number can be set according to the actual situation and is not limited in the present disclosure.

Specifically, in the process of dividing the concentric regions in the test image, the size of each region can be set to be the same or can be set according to the actual situation. The sizes of the concentric regions are not limited in the present disclosure.

In step 904, a first distortion amount and remaining distortion amounts other than the first distortion amount are calculated according to the coordinates of the center point. The distortion coefficient corresponding to the first distortion amount is a preset first distortion coefficient, and the first distortion amount is equal to a vertical distance from the center point of the preset undistorted rectangular region to a boundary of the preset undistorted rectangular region.

In some embodiments, the first distortion amount and the remaining distortion amounts other than the first distortion amount can be calculated according to the coordinates of the center point of the test image. The first distortion amount is equal to a vertical distance from the center point of the preset undistorted rectangular region to a boundary of the preset undistorted rectangular region. Since the shape of the preset undistorted rectangular region is rectangular, the corresponding first distortion amount has two values. If the preset undistorted rectangle region is a square, the corresponding first distortion amount has one value. The remaining distortion amounts are each equal to the vertical distance from the center point of the corresponding remaining region to the boundary of the corresponding remaining region other than the preset undistorted rectangular region. Specifically, the first distortion amount is determined as a reference value since the first distortion amount is the vertical distance from the center point of the preset undistorted rectangular region to the boundary of the preset undistorted rectangular region, and its corresponding distortion coefficient is a preset first distortion coefficient. The preset first distortion coefficient may be selected based on empirical values, which is not limited in the present disclosure.

In step 906, distortion coefficients corresponding to the remaining distortion amounts are determined according to the first distortion amount and the remaining distortion amounts other than the first distortion amount.

In some embodiments, the first distortion amount is a reference value. The distortion coefficients corresponding to the remaining distortion amounts can be calculated according to the first distortion amount and the remaining distortion amounts other than the first distortion amount. The distortion coefficient corresponding to each remaining distortion amount can be calculated by dividing the value of the corresponding remaining distortion amount by the value of the first distortion amount.

An example is provided below to better understand the method for calculating the distortion coefficient. If the test image includes four distortion amounts, which are respectively the first distortion amount $r_0$, the second distortion amount $r_1$, the third distortion amount 72, and the fourth distortion $r_3$. The distortion coefficient $k_1$ corresponding to the second distortion amount $r_1$ is calculated by the formula: $k_1=r_1+r_0$. The distortion coefficient $k_2$ corresponding to the third distortion amount $r_2$ is calculated by the formula: $k_2=r_2+r_0$. The distortion coefficient $k_3$ corresponding to the fourth distortion amount $r_3$ is calculated by the formula: $k_3=r_3+r_0$.

In step 908, it is determined whether the distortion coefficients need to be adjusted according to a preset requirement.

In some embodiments, it is determined whether the distortion coefficients need to be adjusted according to a preset requirement. Specifically, the preset requirement may be to set sampling points and determine whether to adjust the distortion coefficients according to the coordinate information of the set sampling points.

In step 910, the distortion coefficients are adjusted to obtain adjusted distortion coefficients if the distortion coefficients need to be adjusted.

In some embodiments, in the case where it is determined that the distortion coefficients need to be adjusted, the distortion coefficients are adjusted to obtain the adjusted distortion coefficients until the adjusted distortion coefficients meet the preset requirement, then the adjustment of the distortion coefficients is no longer carried out so that the distorted pixel coordinates of the target sampling points are calculated according to the adjusted distortion coefficients.

In this embodiment, the first distortion amount and the remaining distortion amounts are calculated according to the coordinates of the center point, so that the distortion coefficients corresponding to the remaining distortion amounts can be determined according to the first distortion amount and the remaining distortion amounts. It determines, according to the preset requirement, whether the distortion coefficients need to be adjusted to achieve more accurate adjustment of the distortion coefficients, so as to achieve more accurate image correction according to the distortion coefficients.

In an embodiment, the step 906 includes:
establishing an X-axis and a Y-axis in each of the regions in the divided test image according to the coordinates of the center point of the test image, and setting sampling points in each of the regions; and
determining whether the distortion coefficients need to be adjusted according to the sampling points in the regions.

In some embodiments, the method of setting sampling points in each of the regions may be to establish the X-axis and Y-axis in each concentric region in the test image with the coordinates of the center point of the test image as the origin, so as to obtain the sampling points of each of the regions and determine whether the distortion coefficients need to be adjusted according to the sampling points in the regions.

In this embodiment, the horizontal axis and the vertical axis are established based on the coordinates of the center point of the test image, so that the test image is divided into multiple concentric regions according to the coordinates of the center point of the image, the horizontal axis, and the vertical axis. The X-axis and Y-axis are established for each of the regions in the divided test image according to the coordinates of the center point of the test image, and the sampling points are set in each of the regions. It determines whether the distortion coefficients need to be adjusted according to the sampling points in the regions. By dividing the test image into multiple concentric regions and setting the sampling points in each of the regions, it is possible to more accurately determine whether the distortion coefficients need to be adjusted according to the sampling points in each of the regions of the test image.

In an embodiment, the sampling points include a first type of sampling points, and the first type of sampling points are the intersection points of the X-axis established in each of the regions and the boundaries of the corresponding region. The distortion coefficients include horizontal distortion coefficients. The determining whether the distortion coefficients need to be adjusted according to the sampling points in each concentric region includes:

determining whether the first type of sampling points of the regions are on the same horizontal line; and determining that the horizontal distortion coefficients need to be adjusted if the first type of sampling points are not on the same horizontal line.

The distortion amounts may include the horizontal distortion amounts, and the corresponding distortion coefficients may include the horizontal distortion coefficients. The sampling points may include the first type of sampling points, and the first type of sampling points are the intersection points of the X-axis established in each of the regions and the boundaries of the corresponding region. Specifically, it is determined whether the first type of sampling points of the regions are on the same horizontal line, and it is determined that the horizontal distortion coefficients need to be adjusted if the first type of sampling points of the regions in the test image are not on the same horizontal line. Specifically, the horizontal distortion coefficients may be adjusted according to empirical values until the adjusted first type of sampling points of the regions are on the same horizontal line.

In this embodiment, by selecting the intersection points of the X-axis established in each region and the boundaries of the corresponding region as the first type of sampling points and determining whether the first type of sampling points are on the same horizontal line, the horizontal distortion coefficients are adjusted in the case that the first type of sampling points are not on the same horizontal line, so as to obtain more accurate horizontal distortion coefficients, achieving a more accurate image correction according to the more accurate horizontal distortion coefficients.

In an embodiment, the sampling points include a second type of sampling points, and the second type of sampling points are the intersection points of the Y-axis established in each region and the boundaries of the corresponding region. The distortion coefficients include vertical distortion coefficients. The determining whether the distortion coefficients need to be adjusted according to the sampling points in each region also includes:

determining whether the second type of sampling points of the regions are on the same vertical line; and determining that the vertical distortion coefficients need to be adjusted if the second type of sampling points are not on the same vertical line.

The distortion amounts may include the vertical distortion amounts, and the corresponding distortion coefficients include the vertical distortion coefficients. The sampling points may include the second type of sampling points, and the second type of sampling points are the intersection points of the Y-axis established in each region and the boundaries of the corresponding region. Specifically, it is determined whether the second type of sampling points of the regions are on the same vertical line, and it is determined that the vertical distortion coefficients need to be adjusted if the second type of sampling points of the regions in the test image are not on the same vertical line. Specifically, the vertical distortion coefficients may be adjusted according to empirical values until the adjusted second type of sampling points of the regions are on the same vertical line.

In this embodiment, by selecting the intersection points of the Y-axis established in each region and the boundaries of the corresponding region as the second type of sampling points and determining whether the second type of sampling points are on the same vertical line, the vertical distortion coefficients are adjusted in the case that the second type of sampling points are not on the same vertical line, so as to obtain more accurate vertical distortion coefficients, achieving a more accurate image correction according to the more accurate vertical distortion coefficients.

In an embodiment, the determining whether the distortion coefficients need to be adjusted according to the sampling points in each region further includes:

determining that the distortion coefficients do not need to be adjusted in the case that the first type of sampling points are on the same horizontal line and the second type of sampling points are on the same vertical line.

In some embodiments, it is determined that the distortion coefficients do not need to be adjusted if the first type of sampling points and the second type of sampling points in the test image meet the preset requirement. Specifically, in the case that the distortion coefficients are adjusted, it is necessary to determine again whether the first type of sampling points are on the same horizontal line and whether the second type of sampling points are on the same vertical line after the distortion coefficients are adjusted and the adjusted distortion coefficients are obtained, until the first type of sampling points corresponding to the adjusted distortion coefficients are on the same horizontal line and the second type of sampling points are on the same vertical line.

In this embodiment, it means that there is no need to adjust the distortion coefficients if the first type of sampling points are on the same horizontal line and the second type of sampling points are on the same vertical line. The distorted pixel coordinates of the target sampling points are calculated according to the multiple distortion amounts, the distortion coefficient corresponding to each distortion amount, and the original pixel coordinates, so as to calculate the actual deformation of the test image and to correct the test image according to the actual deformation, achieving a tailored optimization of image distortion for each display device.

Figure 11:
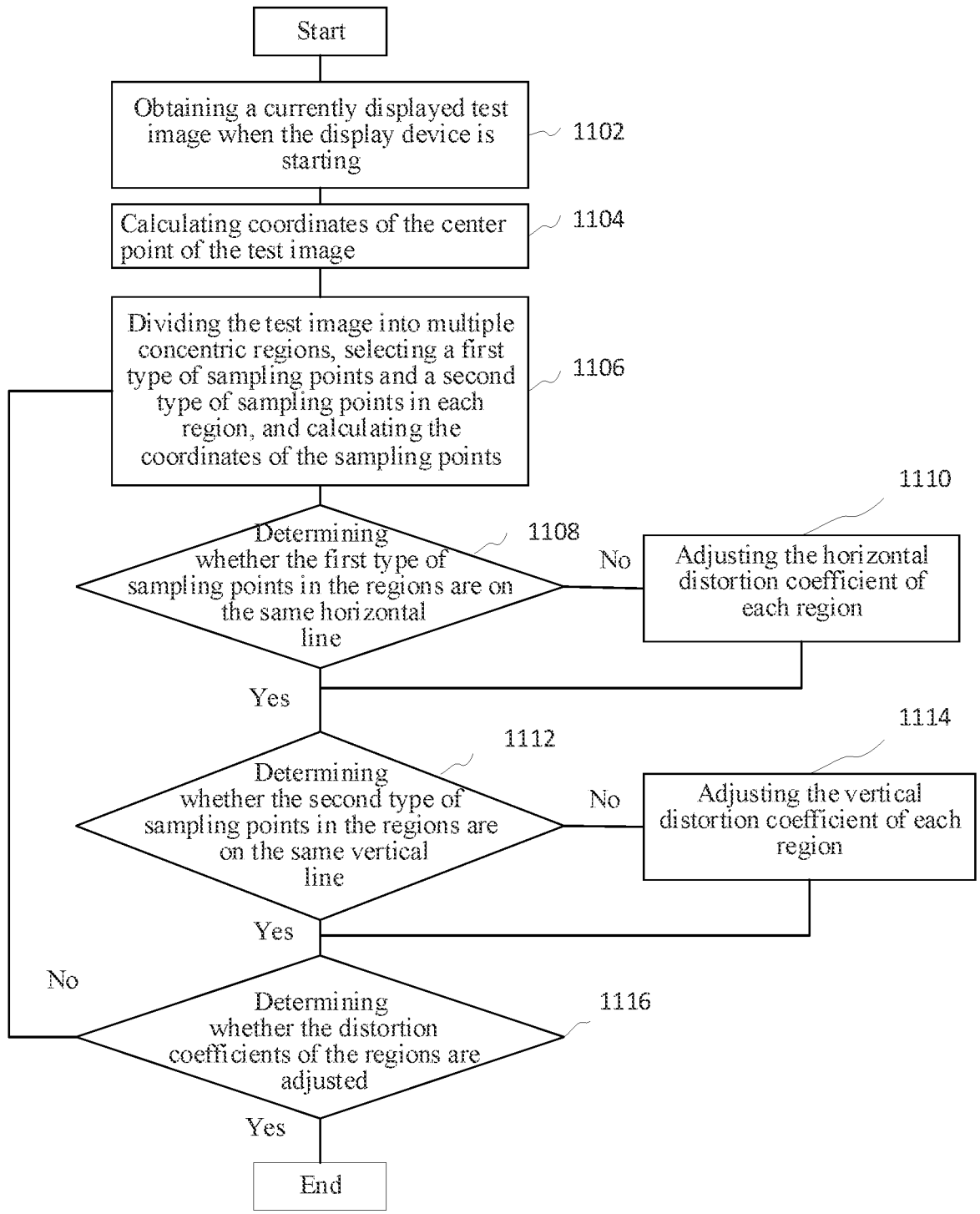
FIG. 11 is a schematic flowchart of adjusting distortion coefficients according to one or more embodiments.

An example is provided to better understand the adjustment process of the distortion coefficients. Referring to FIG. 11, a schematic flowchart of adjusting the distortion coefficients is provided.

In step 1102, a currently displayed test image is obtained when the display device is starting.

In step 1104, coordinates of the center point of the test image are calculated.

In step 1106, the test image is divided into multiple concentric regions, a first type of sampling points and a second type of sampling points are selected in each of the regions, and the coordinates of the sampling points are calculated.

Figure 12:
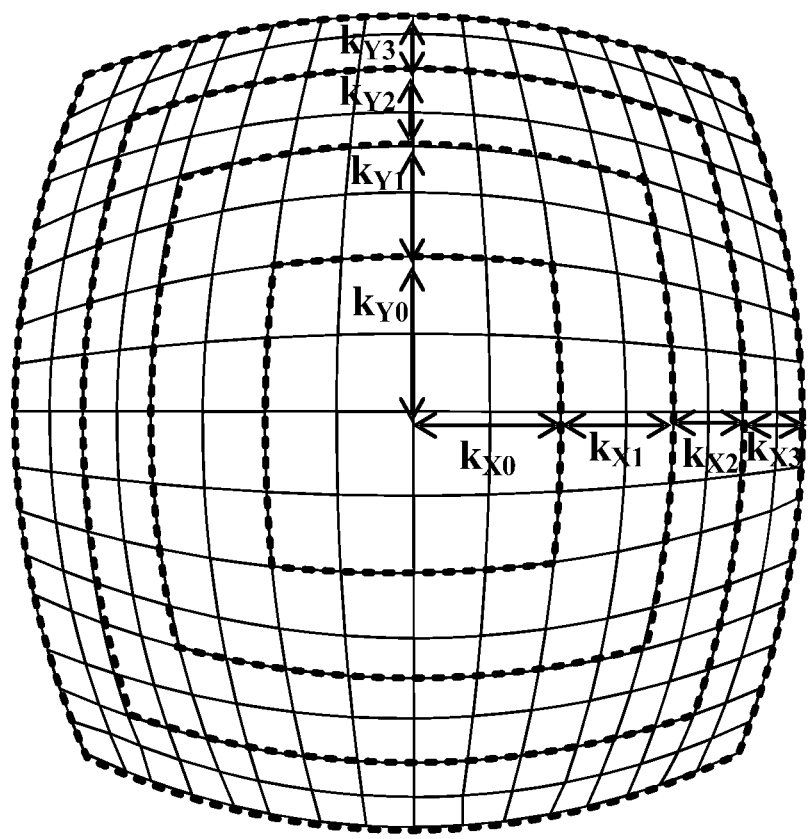
FIG. 12 is a schematic diagram showing horizontal distortion coefficients and vertical distortion coefficients according to one or more embodiments.

Specifically, referring to FIG. 12, a schematic diagram of horizontal distortion coefficients and vertical distortion coefficients is provided. In the case of dividing the test image into four concentric regions, the region in the center is the preset undistorted rectangular region, and the preset first distortion coefficient includes a first horizontal distortion coefficient $k_{x_0}$ and a first vertical distortion coefficient $k_{y_0}$. The distortion coefficients corresponding to the remaining distortion amounts are the second distortion coefficient, the third distortion coefficient, and the fourth distortion coefficient, respectively. The second distortion coefficient includes a second horizontal distortion coefficient $k_{x_1}$ and a second vertical distortion coefficient $k_{y_1}$. The third distortion coefficient includes a third horizontal distortion coefficient $k_{y_2}$ and a third vertical distortion coefficient $k_{y_2}$. The fourth distortion coefficient includes a fourth horizontal distortion coefficient $K_{x_3}$ and a fourth vertical distortion coefficient $k_{y_3}$. The distorted pixel coordinates of the sampling points are calculated according to the original pixel coordinates of the sampling points, the multiple distortion amounts and corresponding distortion coefficients.

Specifically, taking the four concentric regions as an example, the formula for calculating the distorted pixel coordinates of a sampling point according to the original pixel coordinates of the sampling point, the multiple distortion amounts, and the corresponding distortion coefficients is as follows:

$$X_d = X_u(k_{offset-x} + k_{x_0}r_{x_0} + k_{x_1}r_{x_1} + k_{x_2}k_{x_2} + k_{x_3}k_{x_3});$$

$$Y_d = Y_u(k_{offset-y} + k_{y_0}r_{y_0} + k_{y_1}r_{y_1} + k_{y_2}k_{y_2} + k_{y_3}k_{y_3});$$

where $(X_u, Y_u)$ are the original pixel coordinates, $(X_d, Y_d)$ are the distorted pixel coordinates, $k_{offset-x}$ is the compensation adjustment value for the X-axis, $K_{offset-y}$ is the compensation adjustment value for the Y-axis. The compensation adjustment value for the X-axis and the compensation adjustment value for the Y-axis can be set according to empirical values. Generally, the compensation adjustment values are set to be small or zero.

In step 1108, it is determined whether the first type of sampling points in the regions are on the same horizontal line.

In step 1110, the horizontal distortion coefficient of each region is adjusted if the first type of sampling points in the regions are not on the same horizontal line.

In step 1112, it is determined whether the second type of sampling points in the regions are on the same vertical line.

In step 1114, the vertical distortion coefficient of each region is adjusted if the second type of sampling points in the regions are not on the same vertical line.

In step 1116, it is determined whether the distortion coefficients of the regions are adjusted, and it means that the first type of sampling points corresponding to the distortion coefficients are on the same horizontal line and the second type of sampling points are on the same vertical line if the distortion coefficients are not adjusted. In the case that the distortion coefficients of each region are adjusted, the coordinates of the sampling points in each region are recalculated according to the adjusted distortion coefficients.

Figure 13:
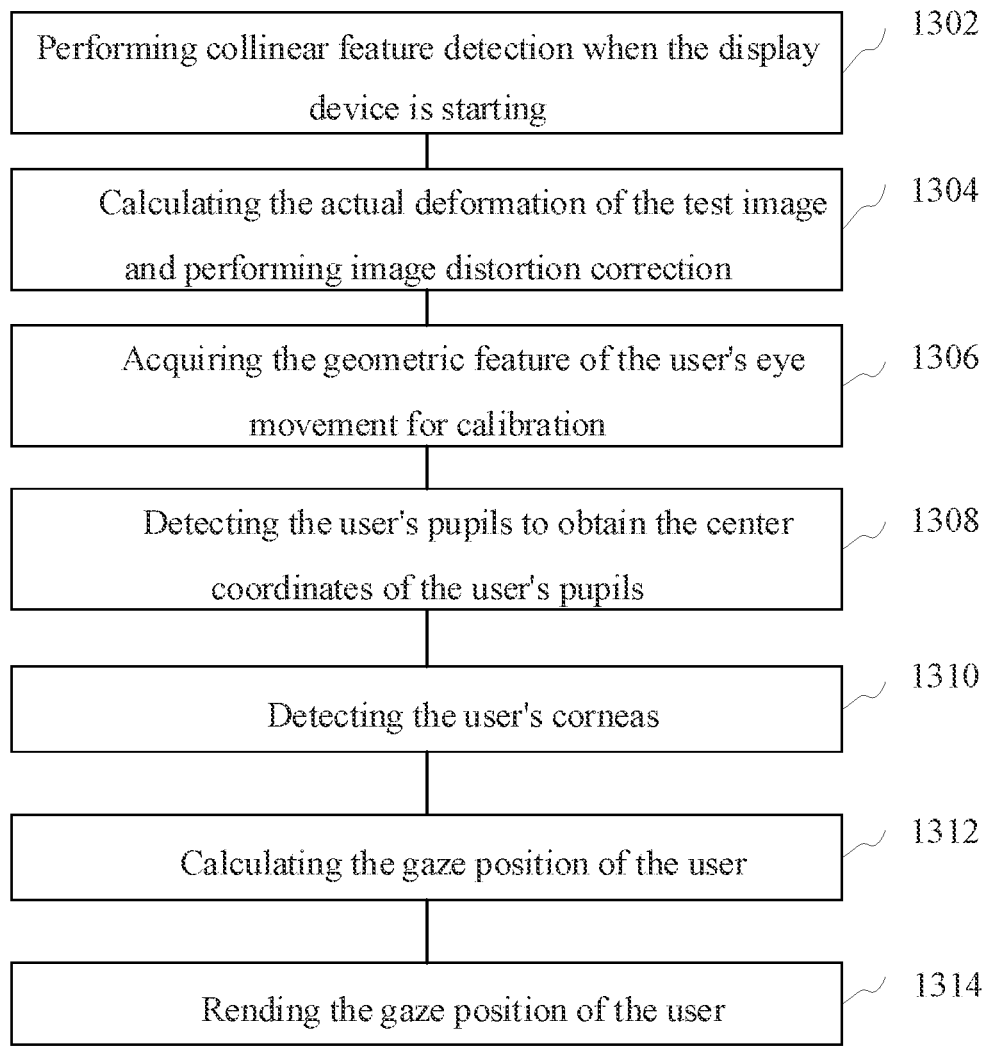
FIG. 13 is a schematic flowchart of using a display device according to one or more embodiments.

An example is provided to better understand the adjustment process of the distortion coefficients. Referring to FIG. 13, a schematic flowchart of using a display device is provided.

In step 1302, collinear feature detection is performed when the display device is starting.

Specifically, when the display device is starting, the infrared sensor in the eye tracking unit is used to detect the test image to calculate the coordinates of the center point of the test image. The test image has a collinear feature.

In step 1304, the actual deformation of the test image is calculated, and image distortion correction is performed.

Exemplarily, the image distortion correction is performed after calculating the actual deformation of the test image according to the coordinates of the center point and the test image with the collinear feature. Specifically, the method for calculating the actual deformation of the test image can refer to the contents of the above-mentioned embodiments.

In step 1306, the geometric feature of the user's eye movement is acquired for calibration.

Specifically, the geometric feature of the user's eye is acquired, which is the basis for customizing and accurate gaze point calculation for the user.

In step 1308, the user's pupils are detected to obtain the center coordinates of the user's pupils.

Specifically, an infrared sensor is used to detect the feature of the user's pupils to calculate the center coordinates of the pupils of the current user.

In step 1310, the user's corneas are detected.

Specifically, an infrared sensor is used to detect the reflection phenomenon of the user's corneas, and the coordinates of the reflection spots of the current user are calculated.

In step 1312, the gaze position of the user is calculated.

Specifically, the gaze position of the user is calculated according to the center coordinates of the user's pupils and the coordinates of the reflection spots.

In step 1314, the gaze position of the user is rendered.

Specifically, image rendering is performed according to the current gaze position of the user.

Figure 14:
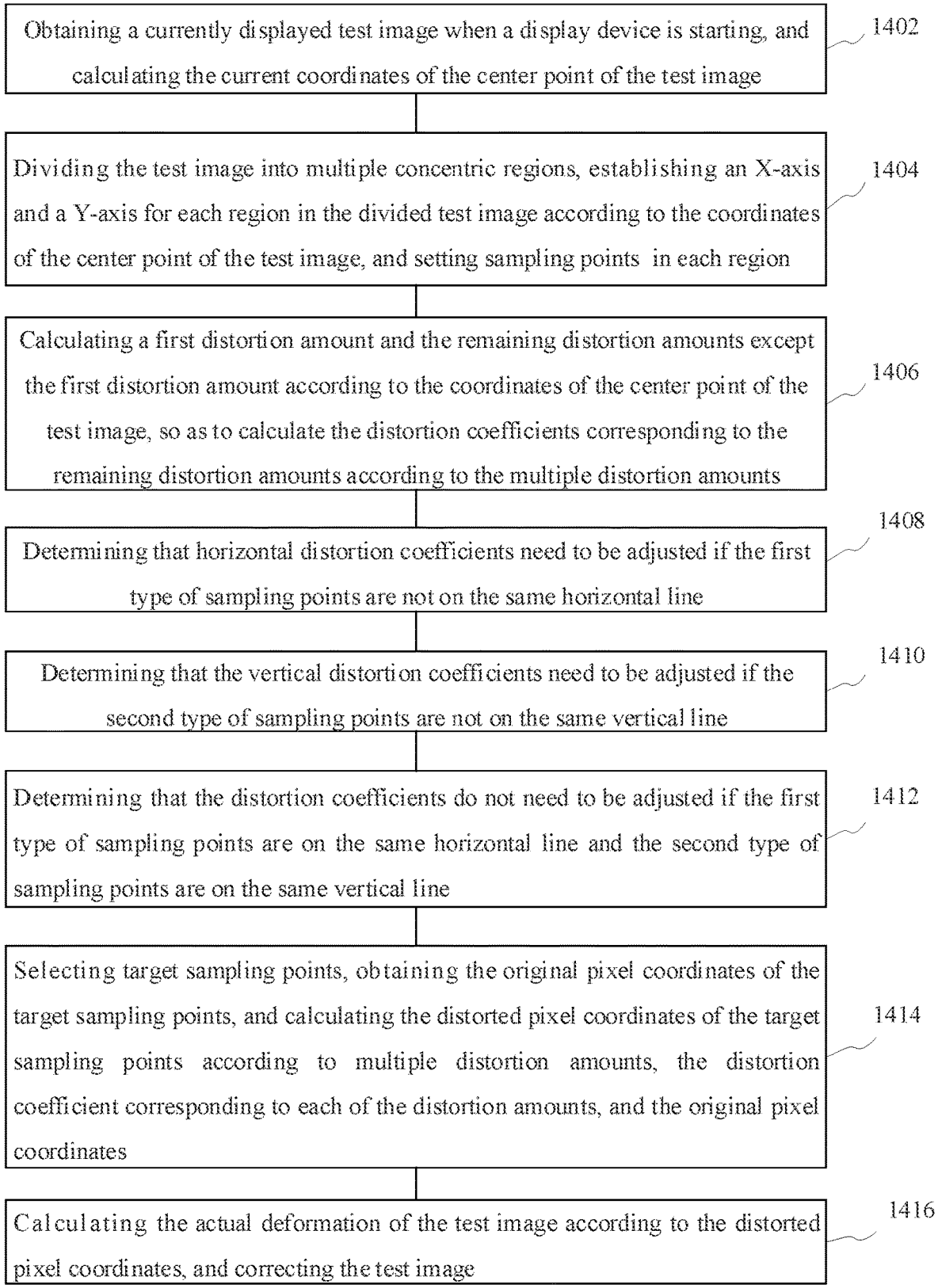
FIG. 14 is a schematic flowchart of a method for image correction according to another embodiment.

A complete example is provided to better understand the complete process of image correction in the embodiments of the present disclosure. Referring to FIG. 14, a schematic flowchart of a method for image correction according to another embodiment is provided. The method includes the following steps.

In step 1402, a currently displayed test image is obtained when a display device is starting, and the current coordinates of the center point of the test image is calculated.

The test image includes a preset undistorted rectangular region, and current coordinates of the center point of the test image can be calculated according to the midpoint of each of the four sides of the preset undistorted rectangular region.

In step 1404, the test image is divided into multiple concentric regions, an X-axis and a Y-axis are established for each region in the divided test image according to the coordinates of the center point of the test image, and sampling points are set in each region.

Specifically, a horizontal axis and a vertical axis are established based on the coordinates of the center point of the test image, so as to divide the test image into multiple concentric regions according to the coordinates of the center point of the test image, the horizontal axis, and the vertical axis. The method of setting sampling points in each region may be to establish an X-axis and a Y-axis in each concentric region in the test image with the coordinates of the center point of the test image as the origin, so as to obtain the sampling points of each region.

In step 1406, a first distortion amount and the remaining distortion amounts other than the first distortion amount are calculated according to the coordinates of the center point of the test image, and the distortion coefficients corresponding to the remaining distortion amounts are calculated according to the multiple distortion amounts.

Specifically, the method for calculating the distortion amounts and the distortion coefficients may be referred to in the above steps 904 to 906, which will not be described herein.

In step 1408, it is determined that horizontal distortion coefficients need to be adjusted if the first type of sampling points are not on the same horizontal line.

The first type of sampling points are the intersection points of the X-axis established in each region and the boundaries of the corresponding region. It is determined whether the first type of sampling points are on the same horizontal line according to the coordinate values of the first type of sampling points. The horizontal distortion coefficients are adjusted if the first type of sampling points are not on the same horizontal line.

In step 1410, it is determined that the vertical distortion coefficients need to be adjusted if the second type of sampling points are not on the same vertical line.

The second type of sampling points are the intersection points of the Y-axis established in each region and the boundaries of the corresponding region. It is determined whether the second type of sampling points are on the same vertical line according to the coordinate values of the second type of sampling points. The vertical distortion coefficients are adjusted if the second type of sampling points are not on the same vertical line.

In step 1412, it is determined that the distortion coefficients do not need to be adjusted if the first type of sampling points are on the same horizontal line and the second type of sampling points are on the same vertical line.

Specifically, in the case that the distortion coefficients are adjusted, it is necessary to determine again whether the first type of sampling points are on the same horizontal line and whether the second type of sampling points are on the same vertical line after the distortion coefficients are adjusted and the adjusted distortion coefficients are obtained, until the first type of sampling points corresponding to the adjusted distortion coefficients are on the same horizontal line and the second type of sampling points are on the same vertical line, then the distortion coefficients will not be adjusted.

In step 1414, target sampling points are selected, the original pixel coordinates of the target sampling points are obtained, and the distorted pixel coordinates of the target sampling points are calculated according to multiple distortion amounts, the distortion coefficient corresponding to each of the distortion amounts, and the original pixel coordinates.

Specifically, the method for calculating the distorted pixel coordinates of the target sampling points can be referred to in the steps 208 to 210, which will not be described herein.

In step 1416, the actual deformation of the test image is calculated according to the distorted pixel coordinates, and the test image is corrected.

Specifically, the method for calculating the actual deformation of the test image may be referred to in the steps 212 to 214, which will not be described herein.

In this embodiment, when the display device is starting, the currently displayed test image is obtained. The coordinates of the center point of the test image are calculated. Multiple distortion amounts and the distortion coefficient corresponding to each distortion amount are determined according to the coordinates of the center point. The target sampling points are selected, and the original pixel coordinates of the target sampling points are obtained. The target sampling points are the vertices of each boundary of the test image. The distorted pixel coordinates of the target sampling points are calculated according to multiple distortion amounts, the distortion coefficient corresponding to each distortion amount, and the original pixel coordinates. The actual deformation of the test image is calculated according to the distorted pixel coordinates. The test image is corrected according to the actual deformation. The present method enables the calculation of the actual deformation of the test image according to the currently displayed test image when the display device is starting, so as to correct the test image according to the actual deformation, achieving a tailored optimization of the image distortion for each display device.

It should be understood that although the steps in the flow charts involved in the above embodiments are sequentially shown by the arrows, these steps are not necessarily executed sequentially in the order indicated by the arrows. Unless otherwise specified herein, the execution of these steps is not strictly limited to the order, and these steps may be executed in other orders. Moreover, at least a part of the steps in the flow charts involved in the above-mentioned embodiments may include multiple steps or stages, and these steps or stages are not necessarily executed at the same time, but may be performed at different times. The execution order of these steps or stages is not necessarily sequentially, but may be performed in turn or alternately with other steps or at least a part of the steps or stages of other steps.

Based on the same inventive concept, the embodiments of the present disclosure also provide a device for image correction for implementing the above-mentioned method for image correction. The solution for solving the problem provided by the device is similar to the solution described in the above method, so that specific limitations in one or more embodiments of the device for image correction provided below can be seen in the foregoing definition of the method for image correction, which is not described again herein.

Figure 15:
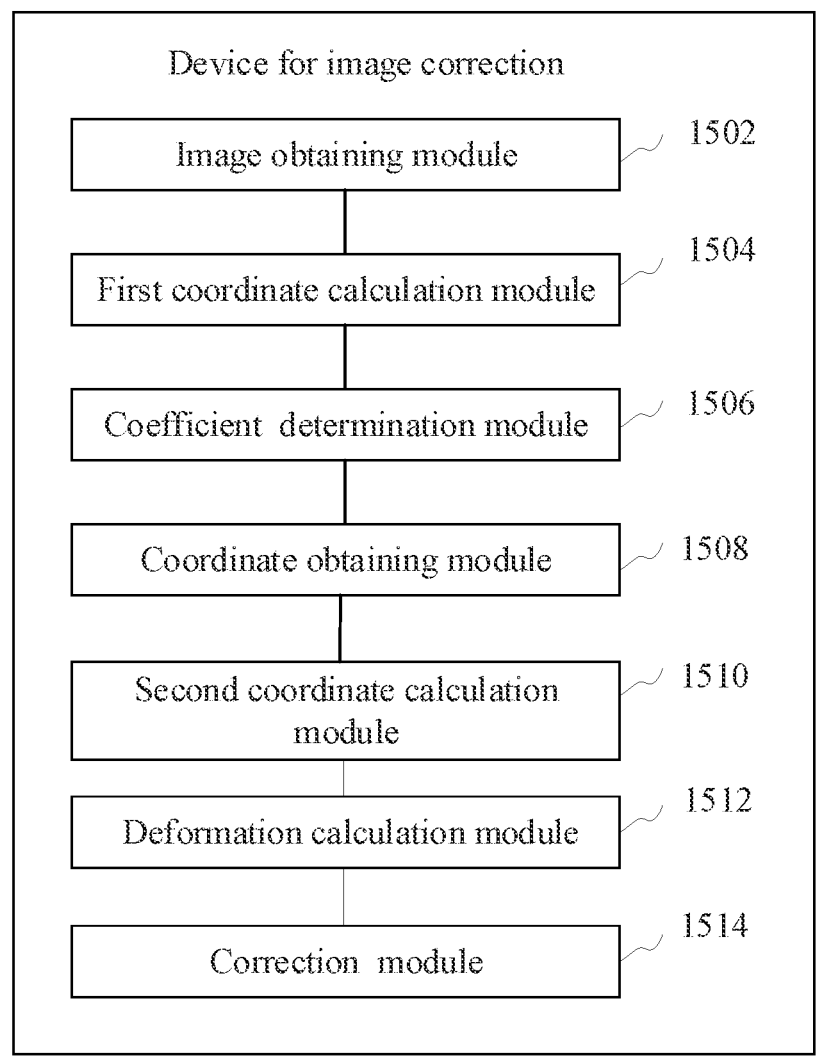
FIG. 15 is a block diagram of a structure of a device for image correction according to one or more embodiments.

In an embodiment, as shown in FIG. 15, there is provided a device for image correction applied to a display device, including an image obtaining module 1502, a first coordinate calculation module 1504, a coefficient determination module 1506, a coordinate obtaining module 1508, a second coordinate calculation module 1510, a deformation calculation module 1512, and a correction module 1514.

The image obtaining module 1502 is configured to obtain a currently displayed test image when the display device is starting.

The first coordinate calculation module 1504 is configured to calculate the coordinates of the center point of the test image.

The coefficient determination module 1506 is configured to determine multiple distortion amounts and a distortion coefficient corresponding to each distortion amount according to the coordinates of the center point.

The coordinate obtaining module 1508 is configured to select target sampling points and obtain the original pixel coordinates of the target sampling points. The target sampling points are the vertices of the boundaries of the test image.

The second coordinate calculation module 1510 is configured to calculate distorted pixel coordinates of the target sampling points according to the multiple distortion amounts, the distortion coefficient corresponding to each of the distortion amounts, and the original pixel coordinates;

The deformation calculation module 1512 is configured to calculate the actual deformation of the test image according to the distorted pixel coordinates.

The correction module 1514 is configured to correct the test image according to the actual deformation.

In some embodiments, the test image includes a preset undistorted rectangular region, and the first coordinate calculation module 1504 includes:

a first coordinate calculation submodule configured to calculate the current coordinates of the center point of the test image according to the midpoint of each of the four sides of the preset undistorted rectangular region.

In some embodiments, the coefficient determination module 1506 includes a region division submodule, a distortion amount calculation submodule, a first distortion coefficient determination submodule, a coefficient adjustment determination submodule, and a first distortion coefficient adjustment submodule.

The region division submodule is configured to divide the test image into multiple concentric regions according to a horizontal axis, a vertical axis, and the coordinates of the center point. The coordinates of the center point of each region are consistent with the coordinates of the center point of the test image. The multiple concentric regions include a preset undistorted rectangular region. The horizontal axis and the vertical axis are set based on the coordinates of the center point of the test image.

The distortion amount calculation submodule is configured to calculate a first distortion amount and the remaining distortion amounts other than the first distortion amount according to the coordinates of the center point. The distortion coefficient corresponding to the first distortion amount is a preset first distortion coefficient. The first distortion amount is equal to the vertical distance from the center point of the preset undistorted rectangular region to the boundary of the preset undistorted rectangular region.

The first distortion coefficient determination submodule is configured to determine distortion coefficients corresponding to the remaining distortion amounts according to the first distortion amount and the remaining distortion amounts other than the first distortion amount.

The coefficient adjustment determination submodule is configured to determine whether the distortion coefficients need to be adjusted according to a preset requirement.

The first distortion coefficient adjustment submodule is configured to adjust the distortion coefficients to obtain adjusted distortion coefficients in the case that the distortion coefficients need to be adjusted.

In some embodiments, the coefficient adjustment determination submodule includes:
  a sampling point setting unit configured to establish an X-axis and a Y-axis in each region in the divided test image according to the coordinates of the center point of the test image, and set sampling points in each region; and
  a coefficient adjustment determination unit configured to determine whether the distortion coefficients need to be adjusted according to the sampling points in each region.

In some embodiments, the sampling points include a first type of sampling points, and the first type of sampling points are the intersection points of the X-axis established in each region and the boundaries of the corresponding region. The distortion coefficients include horizontal distortion coefficients. The coefficient adjustment determination unit includes:
  a first determination subunit configured to determine whether the first type of sampling points in the regions are on the same horizontal line; and
  a first coefficient determination subunit configured to determine that the horizontal distortion coefficients need to be adjusted if the first type of sampling points are not on the same horizontal line.

In some embodiments, the sampling points include a second type of sampling points, and the second type of sampling points are the intersection points of the Y-axis established in each region and the boundaries of the corresponding region. The distortion coefficients include vertical distortion coefficients. The coefficient adjustment determination unit also includes:
  a second determination subunit configured to determine whether the second type of sampling points in the regions are on the same vertical line; and
  a second coefficient determination subunit configured to determine that the vertical distortion coefficients need to be adjusted if the second type of sampling points are not on the same vertical line.

In some embodiments, the coefficient adjustment determination unit further includes:
  a third coefficient determination subunit configured to determine that the distortion coefficients do not need to be adjusted if the first type of sampling points are on the same horizontal line and the second type of sampling points are on the same vertical line.

The modules in the above-mentioned device for image correction may be implemented in whole or in part by software, hardware, and combinations thereof. The above-mentioned modules can be embedded in or independent of a processor in a head-mounted display device in the form of hardware, or may be stored in a memory of the head-mounted display device in the form of software, so as to be called by a processor to perform the corresponding functions of the above modules. operation.

Figure 16:
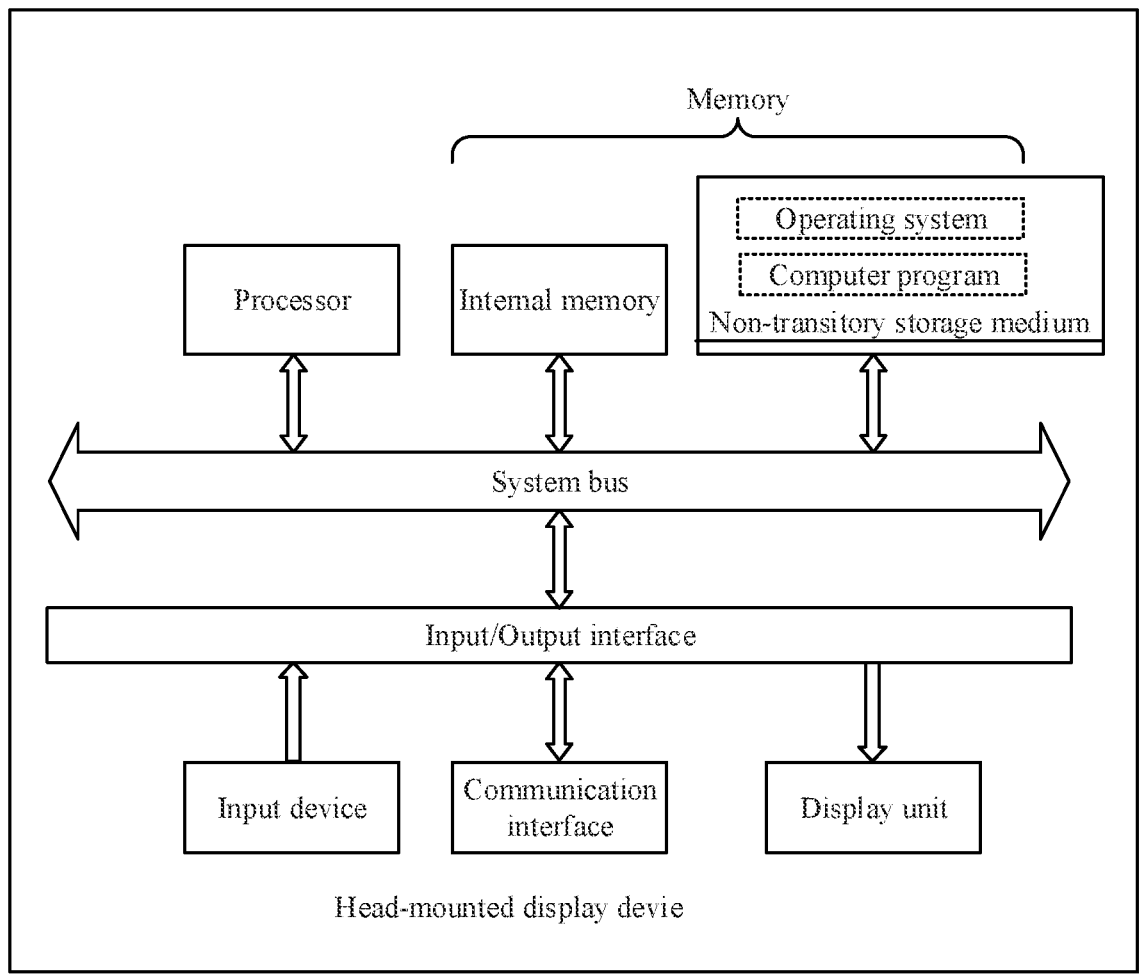
FIG. 16 is a diagram showing an internal structure of a head-mounted display device according to one or more embodiments.

In an embodiment, a head-mounted display device is provided. The head-mounted display device may be a terminal, the internal structure of which may be as shown in FIG. 16. The head-mounted display device includes a processor, a memory, an input/output interface, a communication interface, a display unit, and an input device. The processor, the memory and the input/output interface are connected through a system bus. The communication interface, the display unit, and the input device are connected to the system bus through the input/output interface. The processor of the head-mounted display device is configured to provide computing and control capabilities. The memory of the head-mounted display device includes a non-transitory storage medium and an internal memory. The non-transitory storage medium stores an operating system and computer programs. The internal memory provides an environment for running the operating system and the computer programs in the non-transitory storage medium. The input/output interface of the head-mounted display device is configured to exchange information between the processor and external devices. The communication interface of the head-mounted display device is configured to be in wired or wireless communication external terminals, and the wireless communication can be realized by WIFI, mobile cellular network, near field communication (NFC) or other technologies. The method for image correction is implemented when the computer programs are executed by the processor. The display screen of the head-mounted display device may be a liquid crystal display or an electronic ink display screen. The input device of the head-mounted display device may be a touch layer covered on the display screen, a key, a trackball or a touchpad disposed on the housing of the head-mounted display device, an external keyboard, a touchpad or a mouse, etc.

Those skilled in the art will understand that the structure shown in FIG. 16 is merely a block diagram of a portion of the structure associated with the solution of the present disclosure, and does not constitute a limitation on the head-mounted display device to which the solution of the present disclosure is applied. A specific head-mounted display device may include more or less components than shown in the figure, or may combine certain components, or may have different component arrangements.

In some embodiments, a head-mounted display device is provided, which includes a memory and a processor. The memory stores a computer program therein. The processor, when executing the computer program, performs the following steps:

obtaining a currently displayed test image when the display device is starting;

calculating coordinates of the center point of the test image;

determining multiple distortion amounts and a distortion coefficient corresponding to each distortion amount according to the coordinates of the center point;

selecting target sampling points and obtaining the original pixel coordinates of the target sampling points, the target sampling point being the vertices of the boundaries of the test image;

calculating the distorted pixel coordinates of the target sampling points according to the multiple distortion amounts, the distortion coefficient corresponding to each distortion amount, and the original pixel coordinates;

calculating the actual deformation of the test image according to the distorted pixel coordinates; and correcting the test image according to the actual deformation.

In some embodiments, a non-transitory computer-readable storage medium is provided, in which a computer program is stored. The program, when executed by a processor, causes the processor to perform the following steps:

obtaining a currently displayed test image when the display device is starting;

calculating the coordinates of the center point of the test image;

determining multiple distortion amounts and a distortion coefficient corresponding to each distortion amount according to the coordinates of the center point;

selecting target sampling points and obtaining the original pixel coordinates of the target sampling points, the target sampling points are the vertices of the boundaries of the test image;

calculating the distorted pixel coordinates of the target sampling points according to the multiple distortion amounts, the distortion coefficient corresponding to each distortion amount, and the original pixel coordinates;

calculating the actual deformation of the test image according to the distorted pixel coordinates; and correcting the test image according to the actual deformation.

In some embodiments, a computer program product is provided, which includes a computer program. The computer program, when executed by a processor, causes the processor to perform the following steps:

obtaining a currently displayed test image when the display device is starting;

calculating the coordinates of the center point of the test image;

determining multiple distortion amounts and a distortion coefficient corresponding to each distortion amount according to the coordinates of the center point;

selecting target sampling points and obtaining the original pixel coordinates of the target sampling points, the target sampling points are the vertices of the boundaries of the test image;

calculating the distorted pixel coordinates of the target sampling points according to the multiple distortion amounts, the distortion coefficient corresponding to each distortion amount, and the original pixel coordinates;

calculating the actual deformation of the test image according to the distorted pixel coordinates; and correcting the test image according to the actual deformation.

It should be noted that the user information (including but not limited to user device information, user personal information, etc.) and data (including but not limited to data for analysis, stored data, displayed data, etc.) referred to in the present disclosure are all information and data authorized by the user or fully authorized by all parties. The collection, use and processing of relevant data need to comply with relevant laws, regulations and standards of relevant countries and regions.

A person of ordinary skill in the art can understand that all or part of the processes in the methods of the above embodiments can be achieved by computer instructions instructing the relevant hardware to do so. The computer instructions can be stored in a non-transitory computer-readable storage medium, and when executed, perform the processes such as those of the methods of the embodiments described above. The memory, database, or other medium recited in the embodiments of the disclosure include at least one of non-transitory and transitory memory. The non-transitory memory includes a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric memory (FRAM), a phase change memory (PCM), or a graphene memory, etc. The transitory memory includes a random access memory (RAM) or external cache memory, etc. For illustration rather than limitation, RAM may be in various forms, such as static random access memory (SRAM) or dynamic random access memory (DRAM), etc.

The databases involved in the embodiments of the present disclosure may include at least one of a relational database and a non-relational database. The non-relational databases may include, without limitation, a blockchain-based distributed database, etc. The processors involved in the embodiments of the present application may be general purpose processors, central processing units, graphics processors, digital signal processors, programmable logicians, quantum computing based data processing logicians, etc., without limitation.

The technical features of the foregoing embodiments may be freely combined. For brevity, not all possible combinations of the technical features in the foregoing embodiments are described. However, the combinations of these technical features should be considered to be included within the scope of the present disclosure, as long as the combinations are not contradictory.

The above described embodiments express only implementations of the present disclosure, the descriptions of which are specific and detailed, but cannot be construed as a limitation of the scope of the present disclosure. It is noted that for a person of ordinary skill in the art, variations and improvements can be made without departing from the concept of the present disclosure, which all belong to the protection scope of the present disclosure. Therefore, the protection scope of the present disclosure shall be subject to the attached claims.

What is claimed is:

1. A method for image correction applied to a display device, the method comprising:

obtaining a currently displayed test image when the display device is starting;

calculating coordinates of a center point of the test image;

determining multiple distortion amounts and a distortion coefficient corresponding to each distortion amount according to the coordinates of the center point of the test image;

selecting target sampling points and obtaining original pixel coordinates of the target sampling points, the target sampling points being vertices of each boundary of the test image;

calculating distorted pixel coordinates of the target sampling points according to the multiple distortion amounts, the distortion coefficient corresponding to each distortion amount, and the original pixel coordinates;

calculating an actual deformation of the test image according to the distorted pixel coordinates; and correcting the test image according to the actual deformation.

2. The method according to claim 1, wherein the test image comprises a preset undistorted rectangular region, and the calculating the coordinates of the center point of the test image comprises:

calculating the coordinates of the center point of the test image according to a midpoint of each of four sides of the preset undistorted rectangular region.

3. The method according to claim 2, wherein the determining multiple distortion amounts and the distortion coefficient corresponding to each distortion amount according to the coordinates of the center point of the test image comprises:

dividing the test image into multiple concentric regions according to a horizontal axis, a vertical axis, and the coordinates of the center point, wherein coordinates of a center point of each of the regions are consistent with the coordinates of the center point of the test image, the multiple concentric regions comprising the preset undistorted rectangular region, the horizontal axis and the vertical axis being established based on the coordinates of the center point of the test image;

calculating a first distortion amount and remaining distortion amounts other than the first distortion amount according to the coordinates of the center point of the test image, a distortion coefficient corresponding to the first distortion amount being a preset first distortion coefficient, and the first distortion amount being equal to a vertical distance from the center point of the preset undistorted rectangular region to a boundary of the preset undistorted rectangular region;

determining distortion coefficients corresponding to the remaining distortion amounts according to the first distortion amount and the remaining distortion amounts other than the first distortion amount;

determining whether the distortion coefficients corresponding to the remaining distortion amounts need to be adjusted according to a preset requirement; and adjusting the distortion coefficients corresponding to the remaining distortion amounts to obtain adjusted distortion coefficients if the distortion coefficients corresponding to the remaining distortion amounts need to be adjusted.

4. The method according to claim 3, wherein the determining whether the distortion coefficients corresponding to the remaining distortion amounts need to be adjusted according to the preset requirement comprises:

establishing an X-axis and a Y-axis in each of the regions in the divided test image according to the coordinates of the central point of the test image, and setting sampling points in each of the regions; and determining whether the distortion coefficients corresponding to the remaining distortion amounts need to be adjusted according to the sampling points in the regions.

5. The method according to claim 4, wherein the sampling points comprise a first type of sampling points, the first type of sampling points being intersection points of the X-axis established in each of the regions and the boundaries of the corresponding region, the distortion coefficients comprising horizontal distortion coefficients; and the determining whether the distortion coefficients corresponding to the remaining distortion amounts need to be adjusted according to the sampling points in the regions comprises:

determining whether the first type of sampling points in the regions are on a same horizontal line; and determining that the horizontal distortion coefficients need to be adjusted if the first type of sampling points are not on the same horizontal line.

6. The method according to claim 5, wherein the sampling points comprise a second type of sampling points, the second type of sampling points being intersection points of the Y-axis established in each of the regions and boundaries of the corresponding region, the distortion coefficients comprising vertical distortion coefficients; and the determining whether the distortion coefficients corresponding to the remaining distortion amounts need to be adjusted according to the sampling points in the regions further comprises:

determining whether the second type of sampling points in the regions are on a same vertical line; and determining that the vertical distortion coefficients need to be adjusted if the second type of sampling points are not on the same vertical line.

7. The method according to claim 6, wherein the determining whether the distortion coefficients need to be adjusted according to the sampling points in each of the regions further comprises:

determining that the distortion coefficients do not need to be adjusted if the first type of sampling points are on the same horizontal line and the second type of sampling points are on the same vertical line.

8. The method according to claim 3, wherein the distortion coefficient corresponding to each remaining distortion amount is calculated by dividing a value of the corresponding remaining distortion amount by a value of the first distortion amount.

9. The method according to claim 1, wherein the actual deformation of the test image is calculated according to a vertical distance between a highest point and a lowest point of each boundary of the test image.

10. A non-transitory computer-readable storage medium comprising a computer program stored therein, wherein the computer program, when executed by a processor, causes the processor to perform steps of the method for image correction according to claim 1.

11. A head-mounted display device, comprising a memory and a processor, the memory comprising a computer program stored therein, wherein the processor, when executing the computer program performs operations comprising:

obtaining a currently displayed test image when the display device is starting;

calculating coordinates of a center point of the test image;

determining multiple distortion amounts and a distortion coefficient corresponding to each distortion amount according to the coordinates of the center point of the test image;

selecting target sampling points and obtaining original pixel coordinates of the target sampling points, the target sampling points being vertices of each boundary of the test image;

calculating distorted pixel coordinates of the target sampling points according to the multiple distortion amounts, the distortion coefficient corresponding to each of the distortion amounts, and the original pixel coordinates;

calculating an actual deformation of the test image according to the distorted pixel coordinates; and correcting the test image according to the actual deformation.

12. The head-mounted display device according to claim 11, wherein the test image comprises a preset undistorted rectangular region, and the calculating the coordinates of the center point of the test image comprises:

calculating the coordinates of the center point of the test image according to a midpoint of each of four sides of the preset undistorted rectangular region.

13. The head-mounted display device according to claim 12, wherein the determining multiple distortion amount and a distortion coefficient corresponding to each distortion amount according to the coordinates of the center point of the test image comprises:

dividing the test image into multiple concentric regions according to a horizontal axis, a vertical axis, and the coordinates of the center point, wherein coordinates of a center point of each of the regions are consistent with the coordinates of the center point of the test image; the multiple concentric regions comprising the preset undistorted rectangular region; the horizontal axis and the vertical axis being established based on the coordinates of the center point of the test image;

calculating a first distortion amount and remaining distortion amounts other than the first distortion amount according to the coordinates of the center point of the test image, a distortion coefficient corresponding to the first distortion amount being a preset first distortion coefficient, and the first distortion amount being equal to a vertical distance from the center point of the preset undistorted rectangular region to a boundary of the preset undistorted rectangular region;

determining distortion coefficients corresponding to the remaining distortion amounts according to the first distortion amount and the remaining distortion amounts other than the first distortion amount;

determining whether the distortion coefficients corresponding to the remaining distortion amounts need to be adjusted according to a preset requirement; and adjusting the distortion coefficients corresponding to the remaining distortion amounts to obtain adjusted distortion coefficients if the distortion coefficients corresponding to the remaining distortion amounts need to be adjusted.

14. The head-mounted display device according to claim 13, wherein the determining whether the distortion coefficients corresponding to the remaining distortion amounts need to be adjusted according to the preset requirement comprises:

establishing an X-axis and a Y-axis in each of the regions in the divided test image according to the coordinates of the central point of the test image, and setting sampling points in each of the regions; and determining whether the distortion coefficients corresponding to the remaining distortion amounts need to be adjusted according to the sampling points in the regions.

15. The head-mounted display device according to claim 14, wherein the sampling points comprise a first type of sampling points, the first type of sampling points being intersection points of the X-axis established in each of the regions and the boundaries of the corresponding region, the distortion coefficients comprise horizontal distortion coefficients; and the determining whether the distortion coefficients corresponding to the remaining distortion amounts need to be adjusted according to the sampling points in the regions comprises:

determining whether the first type of sampling points in the regions are on a same horizontal line; and determining that the horizontal distortion coefficients corresponding to the remaining distortion amounts need to be adjusted if the first type of sampling points are not on the same horizontal line.

16. The head-mounted display device according to claim 15, wherein the sampling points comprise a second type of sampling points, the second type of sampling points being intersection points of the Y-axis established in each of the regions and boundaries of the corresponding region, the distortion coefficients comprise vertical distortion coefficients; and the determining whether the distortion coefficients corresponding to the remaining distortion amounts need to be adjusted according to the sampling points in the regions further comprises:

determining whether the second type of sampling points in the regions are on a same vertical line; and determining that the vertical distortion coefficients corresponding to the remaining distortion amounts need to be adjusted if the second type of sampling points are not on the same vertical line.

17. The head-mounted display device according to claim 16, wherein the determining whether the distortion coefficients need to be adjusted according to the sampling points in the regions further comprises:

determining that the distortion coefficients do not need to be adjusted if the first type of sampling points are on the same horizontal line and the second type of sampling points are on the same vertical line.

18. The head-mounted display device according to claim 13, wherein the distortion coefficient corresponding to each remaining distortion amount is calculated by dividing a value of the corresponding remaining distortion amount by a value of the first distortion amount.

19. The head-mounted display device according to claim 11, wherein the actual deformation of the test image is calculated according to a vertical distance between a highest point and a lowest point of each boundary of the test image.

20. The head-mounted display device according to claim 11, comprising an image correction module, wherein the image correction module comprises an image reflection unit, an eye tracking unit, an optical display, and a computing unit;

wherein the image reflection unit comprises a mirror surface to reflect the test image provided by a display screen to the eye tracking unit;

the eye tracking unit comprises a camera to detect distortion information of the image; and the computing unit performs the image correction according to the distortion information detected by the eye tracing unit.

\* \* \* \* \*